(12) United States Patent
Kim et al.

(10) Patent No.: US 8,457,907 B2
(45) Date of Patent: Jun. 4, 2013

(54) COMPENSATION DEVICE FOR FLUIDIC OSCILLATION FLOW METER AND COMPENSATION METHOD USING THE SAME

(75) Inventors: Moon Young Kim, Gunpo-si (KR); Young Geun Hong, Gunpo-si (KR); Hyoung Kee Yang, Gunpo-si (KR); In Sung Cha, Gunpo-si (KR)

(73) Assignee: Shindonga Electronics Co., Ltd, Hwaseong (KR)

( * ) Notice: Subject to any disclaimer, the term of this patent is extended or adjusted under 35 U.S.C. 154(b) by 357 days.

(21) Appl. No.: 12/901,252

(22) Filed: Oct. 8, 2010

(65) Prior Publication Data
US 2012/0089350 A1   Apr. 12, 2012

(51) Int. Cl.
G01F 1/00 (2006.01)

(52) U.S. Cl.
USPC ...... 702/45; 73/861.05; 73/861.08; 73/54.25; 73/54.26; 73/861.19; 702/50; 702/55; 702/56; 702/57

(58) Field of Classification Search
USPC ......... 702/50, 45, 55, 56, 57; 73/239, 861.71, 73/861.05, 861.57, 861.08, 861.53, 54.01, 73/54.24, 54.25, 54.26, 866.5, 54.18, 861.19
See application file for complete search history.

(56) References Cited

U.S. PATENT DOCUMENTS

| | | | | |
|---|---|---|---|---|
| 3,662,598 A * | 5/1972 | Spencer | ..................... | 73/861.05 |
| 4,754,640 A * | 7/1988 | Fitzgerald et al. | ............ | 73/32 A |
| 4,854,176 A * | 8/1989 | Okabayashi | ............... | 73/861.19 |
| 5,181,660 A * | 1/1993 | Stouffer et al. | ............. | 239/589.1 |
| 5,363,704 A * | 11/1994 | Huang | ........................ | 73/861.19 |
| 5,638,867 A * | 6/1997 | Huang | ........................ | 137/826 |
| 5,893,383 A * | 4/1999 | Facteau | ........................ | 137/14 |
| 5,971,301 A * | 10/1999 | Stouffer et al. | ............. | 239/589.1 |
| 5,983,943 A * | 11/1999 | Parry et al. | ..................... | 137/826 |
| 6,253,782 B1 * | 7/2001 | Raghu | ............................ | 137/14 |
| 6,408,866 B1 * | 6/2002 | Carver et al. | .............. | 137/15.01 |
| 6,477,900 B2 * | 11/2002 | Krasilchikov et al. | ..... | 73/861.19 |
| 7,134,609 B1 * | 11/2006 | Stouffer et al. | ............ | 239/225.1 |
| 2007/0006727 A1 * | 1/2007 | Gysling | ............................ | 95/1 |

* cited by examiner

Primary Examiner — Carol Tsai
(74) Attorney, Agent, or Firm — LRK Patent Law Firm

(57) ABSTRACT

A compensation device for fluidic oscillation flow meters is provided. The compensation device includes a fluid supply unit, a fluidic oscillator, an electronic valve, a reference tank and a computer. The fluid supply unit supplies fluid into a pipe. The fluidic oscillator generates a characteristic oscillation frequency when the fluid supplied from the fluid supply unit passes through the fluidic oscillator. The electronic valve controls a flow rate of the fluid passing through the fluidic oscillator. The reference tank accumulates and stores the fluid passing through the electronic valve. The computer calculates a characteristic linear compensation coefficient using data about the time for which the fluid had passed through the fluidic oscillator, an oscillation frequency of the fluidic oscillator, a preset flow rate of the electronic valve, and a preset fluid accumulation amount of the reference tank. The computer stores the calculated characteristic linear compensation coefficient.

7 Claims, 2 Drawing Sheets

COMPENSATION DEVICE FOR FLUIDIC OSCILLATION FLOW METER AND COMPENSATION METHOD USING THE SAME

BACKGROUND OF THE INVENTION

1. Field of the Invention

The present invention relates generally to compensation devices and methods for fluidic oscillation flow meters and, more particularly, to a compensation device and method for a fluidic oscillation flow meter which compensates both for inconsistencies in the measured values due to the characteristics of the fluidic oscillation flow meter used to measure a flow rate of fluid and for inconsistencies in the measured values attributable to the deformation of a mold which may be induced when conducting an injection molding process to produce a fluidic oscillator used to implement fluidic oscillation.

2. Description of the Related Art

With regard to flow meters using oscillation of fluid jets to measure flow rates, fluid discharged from a jet drops in pressure when it comes out of the outlet of the jet. Due to the dropped pressure, the fluid is attracted to a nearby surface and flows along the surface. This phenomenon is called the "Coanda effect".

If a path is provided for the fluid such that some of the fluid which flows along the nearby surface because of the Coanda effect is guided along the fluid path towards the outlet of the jet, the fluid thus flowing along the nearby surface collides with fluid which is flowing forwards thereby impeding advancement of the discharged fluid. Thereby, the fluid jet oscillates. A period of the oscillating fluid jet is proportional to the flow rate of fluid. Hence, the flow rate of the fluid can be determined using the ratio of it to the period. This principle is called "fluidic oscillation". A structure manufactured using the fluidic oscillation principle is called a "fluidic oscillator".

The fluidic oscillator includes a jet nozzle which forcibly discharges fluid, a feedback channel through which discharged fluid reduced in pressure flows towards the jet nozzle along the nearby surface due to the Coanda effect, and an obstacle which promotes oscillations in the discharged fluid.

To analyze the period of oscillation of fluid with respect to the flow rate, the fluid must have a regular laminar flow. Reynolds number analysis is used to discern whether the flow of fluid is in the regular state or not. A boundary value at which the flow of fluid changes from laminar to turbulent is called the "critical Reynolds number". Even though a fluidic oscillator should be designed such that the laminar flow of fluid is stably maintained, a fluidic oscillator which is over the critical value may be manufactured depending on conditions (pressure, temperature, humidity, etc.) present during the injection molding process. In this case, there is a problem because despite the fluid passing through the fluidic oscillator at the same flow rate, the results may differ.

Furthermore, because of some characteristics of the flow meter using the above-mentioned fluidic oscillation, when the flow rate of fluid passing through the flow meter linearly varies, oscillation frequency of the fluid is also changed depending on variations in the flow rate. Thus, the measured data is detected as non-linear rather than having a constant proportional value.

Therefore, a fluidic oscillation flow meter and a method are required, which are capable of correctly measuring the flow rate of fluid despite the problem induced by the characteristics of the fluidic oscillator which may be over the critical value and despite variations in oscillation frequency of fluid depending on variations in the flow rate.

SUMMARY OF THE INVENTION

Accordingly, the present invention has been made keeping in mind the above problems occurring in the prior art, and an object of the present invention is to provide a compensation device and method for a fluidic oscillation flow meter which compensates both for inconsistencies in the measured values due to the characteristics of the fluidic oscillator used in the flow meter and for inconsistencies in the measured values attributable to variations in the oscillation frequency of a fluid depending on variations in the flow rate, thus making it possible to consistently measure the flow rate of a fluid.

In order to accomplish the above object, the present invention provides a compensation device for a fluidic oscillation flow meter including: a fluid supply unit having a fluid tank and a pump which supplies fluid into a pipe for implementing fluidic oscillation and controls the flow rate of the fluid in steps; a fluidic oscillator for measuring the flow rate of fluid passing through the pipe; an oscillation frequency detector detecting the oscillation frequency when fluid passes through the fluidic oscillator; an electronic valve controlling the flow of fluid through the pipe; an electronic valve controller controlling the operation of the electronic valve; a reference tank accumulating and storing fluid that has arrived through the electronic valve; a level meter checking the amount of fluid accumulated in the reference tank; a computer having a valve control unit, a compensation coefficient calculator, a storage unit and a control unit. The valve control unit receives a signal telling of the amount of accumulated fluid checked by the level meter and transmits an interruption signal to the electronic valve controller. The compensation coefficient calculator receives data about the amount of accumulated fluid in the reference tank checked by the level meter, a time for which the accumulated fluid passes through the fluidic oscillator, and the oscillation frequency of the fluidic oscillator measured by the oscillation frequency detector and then calculates a characteristic linear compensation coefficient of the fluidic oscillator. The storage unit combines the characteristic linear compensation coefficient calculated by the compensation coefficient calculator with data of the fluidic oscillator and stores the combined data. The control unit controls the compensation coefficient calculator and the valve control unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, an embodiment of the present invention will be described in detail with reference to the attached drawings.

A fluidic oscillator used in a fluidic oscillation flow meter will be explained to more clearly understand the embodiment of the present invention. When the fluidic oscillator is formed by injection molding, the portion that forms the fluid jet may be formed in an incorrect and not the desired shape. In this case, the number of oscillations of fluid according to a flow rate becomes different from existing data obtained from tests of fluidic oscillators. Thus, a lot of errors occur when measuring the flow rate. It has been known that when a flow rate of fluid is measured by such a fluidic oscillator, as the flow rate of fluid is low, the precision thereof is reduced.

A critical Reynolds number at which the flow of fluid changes from laminar to turbulent ranges from about 2000 to about 2800 or more. An equation for measuring the flow rate when the flow of fluid changes from laminar to turbulent is as follows:

$$\text{stable Reynolds number} < \text{critical Reynolds number} = \frac{\text{flow rate}}{\text{kinematic viscosity} \times \text{pipe diameter}}$$

In the above equation,
When the critical Reynolds number=2500,
kinematic viscosity=1.007×106 m'/s, and
diameter of a typical domestic water supply pipe=15 mm,
the flow rate is about 0.136 m'/h. From this, it can be understood that turbulence occurs when the flow rate is 0.136 m' or less per an hour. Furthermore, it is well known that when a cross-section area of the portion of the fluidic oscillator that forms a fluid jet varies by 0.01 inch, the generated oscillation frequency differs widely.

Figure 1:
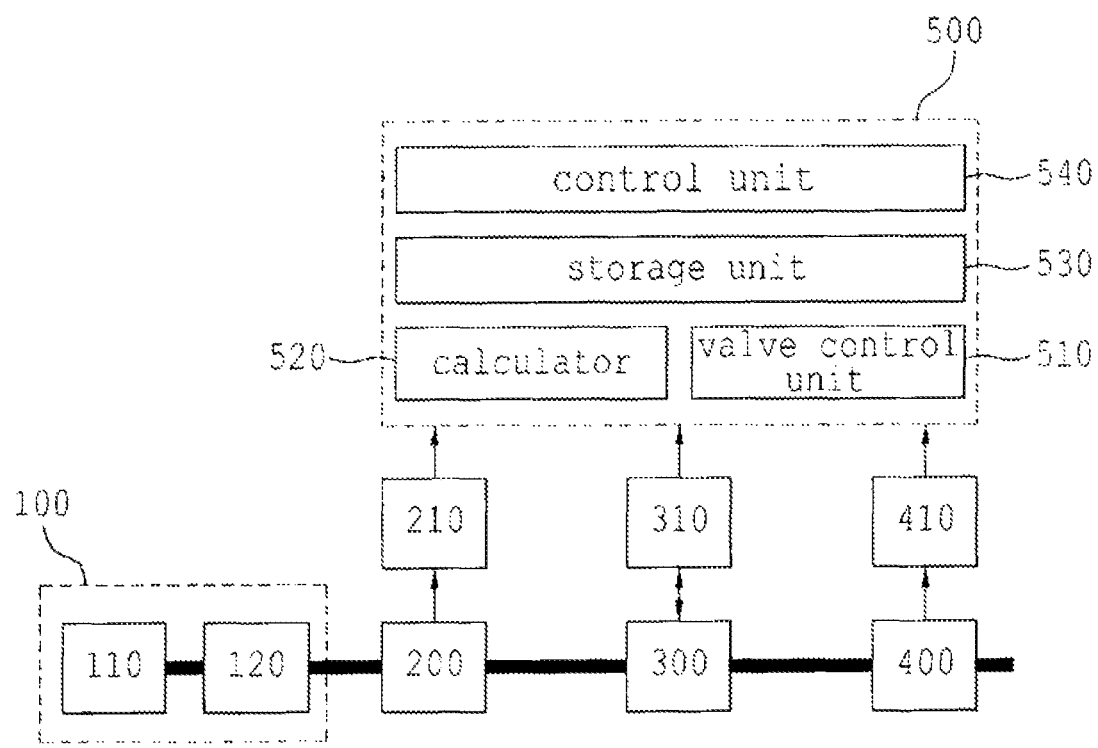
FIG. 1 is a block diagram showing the construction of a compensation device for a fluidic oscillation flow meter, according to an embodiment of the present invention.

FIG. 1 is a block diagram showing the construction of a compensation device for a fluidic oscillation flow meter, according to an embodiment of the present invention.

As shown in FIG. 1, the compensation device for the fluidic oscillation flow meter according to the present invention includes a fluid supply unit 100, a fluidic oscillator 200, an oscillation frequency detector 210, an electronic valve 300, an electronic valve controller 310, a reference tank 400, a level meter 410 and a computer 500. The fluid supply unit 100 includes a fluid tank 110 and a pump 120 which supplies fluid through a pipe to the fluidic oscillator 200 for implementing fluidic oscillation and controls the flow rate of the fluid in steps. The fluidic oscillator 200 is used to measure the flow rate of fluid passing through the pipe. The oscillation frequency detector 210 detects the oscillation frequency when fluid passes through the fluidic oscillator 200. The electronic valve 300 controls the flow of fluid through the pipe, and the electronic valve controller 310 controls the operation of the electronic valve 300. The reference tank 400 is provided with a level gauge and accumulates and stores fluid that has arrived through the electronic valve 300. The level meter 410 checks the amount of fluid accumulated in the reference tank 400. The computer 500 includes a valve control unit 510, a compensation coefficient calculator 520, a storage unit 530 and a control unit 540. The valve control unit 510 receives a signal telling of the amount of accumulated fluid checked by the level meter 410 and transmits an interruption signal to the electronic valve controller 310. The compensation coefficient calculator 520 receives data about the amount of accumulated fluid in the reference tank 400 checked by the level meter 410, a time for which the accumulated fluid passes through the fluidic oscillator, and the oscillation frequency of the fluidic oscillator 200 measured by the oscillation frequency detector 210 and then calculates a characteristic linear compensation coefficient of the fluidic oscillator 200. The storage unit 530 combines the characteristic linear compensation coefficient calculated by the compensation coefficient calculator 520 with data of the fluidic oscillator 200 and stores the combined data. The control unit 540 controls the compensation coefficient calculator 520 and the valve control unit 510.

Fluid which is an object to be measured and has been contained in the fluid tank 110 is transferred to the pipe by the operation of the pump 120. When fluid which is transferred through the pipe passes through the fluidic oscillator 200, the fluid oscillates and a characteristic oscillation frequency is generated in response to the flow rate of the fluid. The oscillation frequency detector 210 measures the oscillation frequency generated in the fluidic oscillator 200 and sends a signal containing the measurement to the compensation coefficient calculator 520 of the computer 500. Fluid which has passed through the fluidic oscillator 200 is controlled by the electronic valve 300 such that it passes through the electronic valve 300 at a preset flow rate. After the fluid has passed through the electronic valve 300, it is accumulated and stored in the reference tank 400. The level meter 410 checks the amount of fluid accumulated in the reference tank 400. When the amount of accumulated fluid reaches a preset volume, the level meter 410 sends a corresponding signal to the computer 500. According to the signal transmitted from the level meter 410, the valve control unit 510 of the computer 500 sends a signal for turning off the electronic valve 300 to the electronic valve controller 310. Then, the electronic valve 300 is turned off under the control of the electronic valve controller 310. After the electronic valve 300 is turned off, the compensation coefficient calculator 520 calculates a characteristic linear compensation coefficient of the fluidic oscillator 200 according to a control signal of the control unit 540 of the computer 500 and then stores the result in the storage unit 530.

For example, a tank having a capacity of 100 l and an MPE (maximum permissible error) of ±0.2% may be used as the reference tank 400.

With regards to calculating of the characteristic linear compensation coefficient of the fluidic oscillator 200, the flow rate per a predetermined unit of time is calculated from a time for which fluid had passed through the fluidic oscillator 200. Calculating the coefficient also takes into account the flow rate preset in the electronic valve 300 and the amount of accumulated fluid preset for the reference tank 400. A characteristic linear compensation coefficient of the fluidic oscillator 200 is calculated both from the calculated flow rate per a predetermined unit of time and from a fluidic oscillation frequency generated when fluid passes through the fluidic oscillator 200.

As the flow rate is increased by 0.001 m'/h in steps from the minimum flow rate to the critical flow rate, a characteristic linear compensation coefficient of the fluidic oscillator 200 is calculated at each step by the above-mentioned method. The calculated characteristic linear compensation coefficients are stored in the storage unit 530.

In the same manner, as the flow rate is increased by 0.1 m'/h in steps up to the overload flow rate of the 15 mm standard water meter according to the OIML (International Organization of Legal Metrology), a characteristic linear compensation coefficient of the fluidic oscillator 200 is calculated at each step by the above-mentioned method When the flow meter including the fluidic oscillator 200 is assembled, a characteristic linear compensation coefficient corresponding to a characteristic oscillation frequency of the fluidic oscillator 200 is found from the storage unit 530 and applied to the flow meter.

The process of calculating a characteristic linear compensation coefficient of the fluidic oscillator 200 will be explained in more detail.

For example, in the case of a general domestic water supply pipe having a size of 15 mm, when the basic oscillation period is 1000 msec (the time for which oscillation occurs once a second) a flow rate becomes about 0.06 m'/h which is within a nonlinear distribution range less than 50% of the 0.135 m'/h which is the flow rate at the critical. Reynolds number.

In other words, based on the flow rate of the basic oscillation period being 0.06 m'/h, the nonlinear distribution of the flow rate is subdivided by 0.001 m'/h in steps both to a flow rate of 0.016 m'/h (the minimum flow rate of the 15 mm standard water meter of the OIML, which is less than the flow rate of the basic oscillation period), up to the critical expected maximum flow rate of 0.135 m'/h. An oscillation period is measured at each step. When the time taken to charge a predetermined amount of fluid into the reference tank is divided by the oscillation period, the number of oscillations which are generated while the predetermined amount of fluid is charged into the reference tank is calculated.

A linear compensation coefficient is obtained by dividing the amount of fluid that has been charged into and accumulated in the reference tank by the calculated number of oscillations Linear compensation coefficients corresponding to the steps from the minimum flow rate to the critical expected maximum flow rate are determined by the above-mentioned method. With reference to the flow rate when it is over the critical expected maximum flow rate, linear compensation coefficients are calculated in the same manner in units of 0.1 m'/h in steps to 2.5 m'/h which is the overload flow rate of the 15 mm standard water meter of OIML.

The fluidic oscillator can have a stable linear compensation coefficient which is within an MPE of ±5% below the expected critical flow rate of the 15 mm standard water meter, and which is within an MPE of ±2% above the expected critical flow rate of the 15 mm standard water meter. Therefore, the present invention can minimize the rate of defectives attributable to deformation when forming the fluidic oscillator by injection molding.

Figure 2:
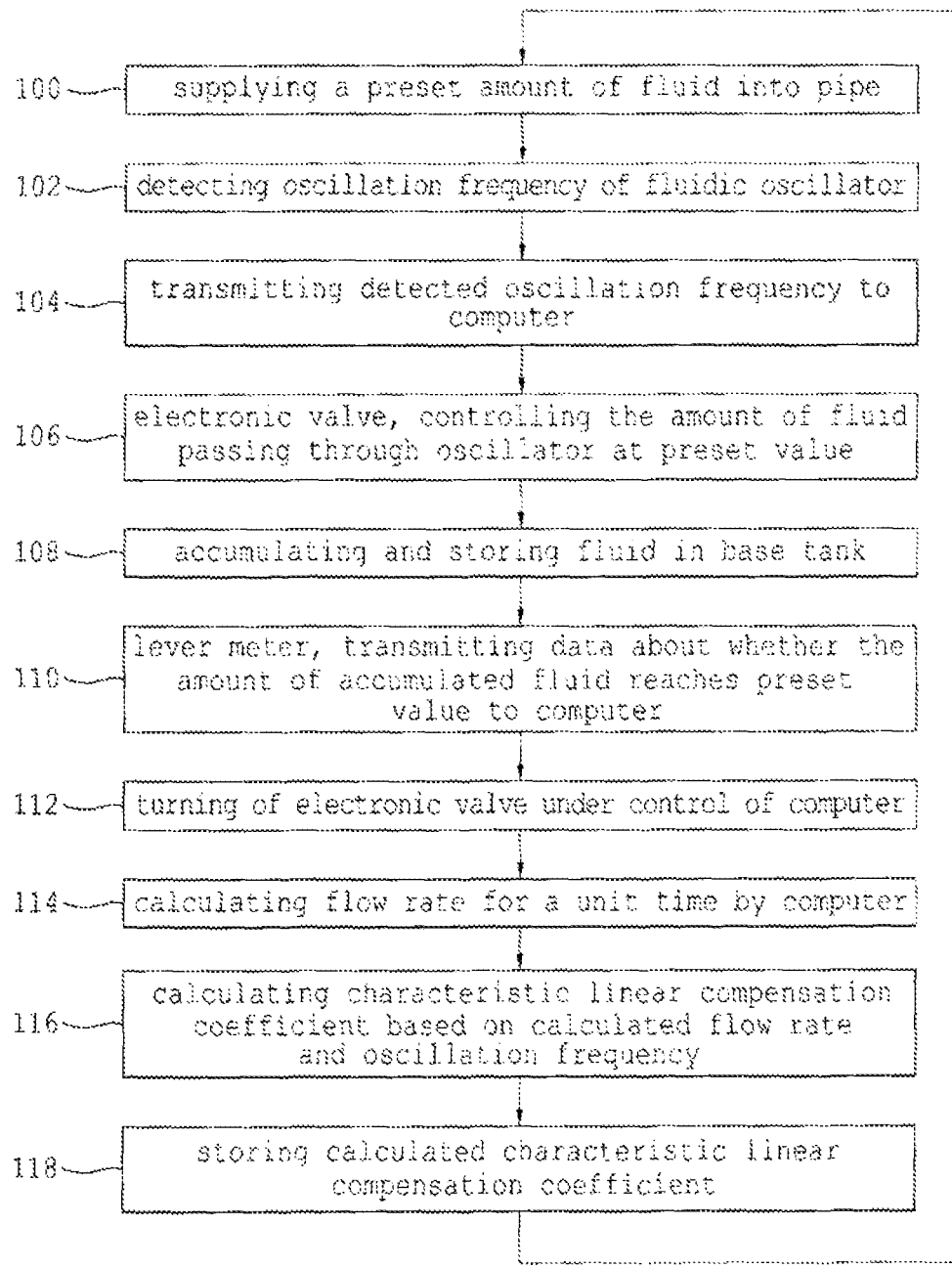
FIG. 2 is a flowchart of an embodiment of a compensation method of the fluidic oscillation flow meter according to the present invention.

FIG. 2 is a flowchart of an embodiment of a compensation method of the fluidic oscillation flow meter according to the present invention.

In the compensation method of the present invention, at step S100, fluid is supplied from the fluid supply unit into the pipe. At step S102, the oscillation frequency detector detects an oscillation frequency generated when fluid supplied from the fluid supply unit passes through the fluidic oscillator. At step S104, the oscillation frequency detected by the oscillation frequency detector is transmitted to the computer. At step S106, fluid which has passed through the fluidic oscillator is controlled such that it passes through the electronic valve at a flow rate preset by the electronic valve. At step S108, fluid which has passed through the electronic valve accumulates and is stored in the reference tank. At step S110, the level meter checks the amount of fluid accumulated in the reference tank, and when the amount of accumulated fluid reaches a preset amount, the level meter detects that and transmits a corresponding detection signal to the computer. At step S112, the computer receives the detection signal from the level meter and turns off the electronic valve. At step S114, the computer checks the time for which fluid had passed through the fluidic oscillator, the preset flow rate of the electronic valve and the preset fluid accumulation amount of the reference tank and thus calculates the flow rate for a predetermined unit time. At step S116, the computer calculates a characteristic linear compensation coefficient for the fluidic oscillator based on the oscillation frequency generated when the fluid passes through the fluidic oscillator. At step S118, the computer stores the calculated characteristic linear compensation coefficient of the fluidic oscillator in the storage unit.

Furthermore, in the compensation method of the flow meter of the present invention, in the electronic valve, the flow rate is subdivided by the unit flow rate in steps from the basic flow rate up to the critical expected maximum flow rate, and a characteristic linear compensation coefficient of the fluidic oscillator is calculated at each step and stored.

When the flow meter including the fluidic oscillator is manufactured, the computer refers to the characteristic linear compensation coefficients of the fluidic oscillator which are calculated based on the oscillation frequency of the fluidic oscillator and stored in the storage unit and then applies a corresponding characteristic linear compensation coefficient to the flow meter.

As described above, a compensation device and method for a fluidic oscillation flow meter according to the present invention can compensate both for inconsistencies in the measured values due to the characteristics of a fluidic oscillator used in the flow meter and for inconsistencies in the measured values attributable to variations in the oscillation frequency of fluid depending on variations in the flow rate. Therefore, the present invention makes it possible to consistently measure the flow rate of fluid.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A compensation device for fluidic oscillation flow meters, comprising:
   a fluid supply unit supplying fluid into a pipe;
   a fluidic oscillator generating a characteristic oscillation frequency when the fluid supplied from the fluid supply unit passes through the fluidic oscillator;
   an electronic valve controlling a flow rate of the fluid passing through the fluidic oscillator;
   a reference tank accumulating and storing therein the fluid passing through the electronic valve; and
   a computer calculating a characteristic linear compensation coefficient using data about a time for which the fluid passes through the fluidic oscillator, an oscillation frequency of the fluidic oscillator, a preset flow rate of the electronic valve and a preset fluid accumulation amount of the reference tank, the computer storing the calculated characteristic linear compensation coefficient.

2. The compensation device as set forth in claim 1, further comprising:
   means for controlling the fluid supply unit such that the fluid is supplied in steps from the fluid supply unit into the pipe;
   an oscillation frequency detector detecting the oscillation frequency of the fluidic oscillator; and
   a level meter measuring whether the amount of fluid accumulated in the reference tank has reached the preset fluid accumulation amount.

3. The compensation device as set forth in claim 2, wherein the computer comprises:
   a valve control unit controlling opening of the electronic valve and the flow rate of fluid passing through the electronic valve;

a compensation coefficient calculator calculating the characteristic linear compensation coefficient of the fluidic oscillator; and a storage unit storing the calculated linear compensation coefficient.

4. The compensation device as set forth in claim 1, wherein the computer calculates the characteristic linear compensation coefficient of the fluidic oscillator both from a flow rate for a predetermined unit time and the oscillation frequency of the fluidic oscillator, the flow rate for the predetermined unit time being determined by the time for which fluid had passed through the fluidic oscillator, the preset flow rate of the electronic valve and the preset fluid accumulation amount of the reference tank.

5. A compensation method of a fluidic oscillation flow meter, comprising:

supplying fluid from a fluid supply unit into a pipe;

detecting an oscillation frequency using an oscillation frequency detector when the fluid supplied from the fluid supply unit passes through a fluidic oscillator, and transmitting the detected oscillation frequency to a computer;

controlling the fluid using an electronic valve such that the fluid passing through the fluidic oscillator passes through the electronic valve at a preset flow rate;

accumulating and storing the fluid passing through the electronic valve in a reference tank;

checking the amount of fluid accumulated in the reference tank using a level meter, and transmitting a detection signal to the computer when the amount of accumulated fluid reaches a preset fluid accumulation amount;

receiving the detection signal from the level meter using the computer and turning off the electronic valve;

checking, a time for which fluid had passed through the fluidic oscillator, the preset flow rate of the electronic valve, and the preset fluid accumulation amount of the reference tank using the computer, and then calculating a flow rate for a predetermined unit time;

calculating a characteristic linear compensation coefficient of the fluidic oscillator based on the oscillation frequency generated when fluid passes through the fluidic oscillator; and storing the calculated characteristic linear compensation coefficient of the fluidic oscillator in a storage unit.

6. The compensation method as set forth in claim 5, wherein in the electronic valve, the flow rate is subdivided per a unit flow rate into steps from a basic flow rate to a critical expected maximum flow rate, and a characteristic linear compensation coefficient of the fluidic oscillator is calculated at each step and stored in the storage unit.

7. The compensation method as set forth in claim 5, wherein when the flow meter including the fluidic oscillator is manufactured, the computer refers to the characteristic linear compensation coefficients of the fluidic oscillator which are calculated based on the oscillation frequency of the fluidic oscillator and stored in the storage unit and then applies a corresponding characteristic linear compensation coefficient to the flow meter.

* * * * *